(12) United States Patent
Fuge

(10) Patent No.: US 6,860,026 B2
(45) Date of Patent: Mar. 1, 2005

(54) MACHINE TOOL PROBE

(75) Inventor: Jonathan Paul Fuge, Bristol (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/477,894

(22) PCT Filed: Jun. 14, 2002

(86) PCT No.: PCT/GB02/02482
§ 371 (c)(1),
(2), (4) Date: Nov. 19, 2003

(87) PCT Pub. No.: WO02/103283
PCT Pub. Date: Dec. 27, 2002

(65) Prior Publication Data
US 2004/0134085 A1 Jul. 15, 2004

(30) Foreign Application Priority Data
Jun. 16, 2001 (GB) .............................. 0114765

(51) Int. Cl.⁷ ............................ G01B 5/03; G08C 23/04
(52) U.S. Cl. ....................................................... 33/556
(58) Field of Search .......................... 33/556, 558, 559, 33/561, 503

(56) References Cited
U.S. PATENT DOCUMENTS 4,153,998 A    5/1979  McMurtry
5,150,529 A  *  9/1992  Collingwood ................ 33/503
5,777,562 A  *  7/1998  Hoffman ................. 340/870.07
5,949,352 A  *  9/1999  Ferrari ......................... 33/558
6,118,567 A     9/2000  Alameh et al.
6,526,670 B1 *  3/2003  Carli ............................ 33/503
6,643,944 B2 * 11/2003  Yoda et al. .................... 33/558

FOREIGN PATENT DOCUMENTS

EP    0 337 669 B1   10/1989
EP    0 337 670 A2   10/1989
GB    2 137 457 A    10/1984

* cited by examiner

Primary Examiner—G. Bradley Bennett
(74) Attorney, Agent, or Firm—Oliff & Berridge, PLC

(57) ABSTRACT

A probe for position determining apparatus such as a machine tool transmits optical measurement signals to a receiver module. The probe is battery powered and the battery powers light emitting diodes which transmit the optical measurement signals. The optical measurement signals comprise serially transmitted codewords which are generated by a universal synchronous/asynchronous receiver transmitter (USART). The output of the USART is combined with a pulse width modulator which has an output having the same form as the output of the USART but with reduced duration of each pulse, thus enhancing the life of the battery powering the light emitting diodes. The pulse width modulator may also be used to set the timing of the USART.

10 Claims, 2 Drawing Sheets

MACHINE TOOL PROBE

This invention relates to probes for use on position determining apparatus such as coordinate measuring machines, measuring robots and in particular machine tools.

An example of such a probe is shown in U.S. Pat. No. 4,153,998. Probes intended for use on machine tools in which there is a wireless signal transmission between the probes and the controller of the machine tool are shown in European Patent Nos. 337669 and 337670.

When used on machine tools such probes are commonly battery-operated. These probes may transmit measurement signals optically to a receiver module however, the power consumption in sending these optical messages reduces the battery life.

The present invention provides a probe for position determining apparatus comprising:

signal generating means for generating a signal;

signal transmitting means for transmitting the signal generated by the signal generating means to a receiver module in the form of optical pulses;

characterised in that a pulse width modulator is provided to reduce the duration of each pulse.

Preferably the signal generating means includes a universal synchronous/asynchronous receiver transmitter. The pulse width modulator may control the timing of the universal synchronous/asynchronous receiver transmitter (USART).

Preferably the probe is battery powered. The optical pulses may be generated by LEDs.

A preferred embodiment of the invention will now be described with reference to the accompanying drawings wherein.

Figure 1:
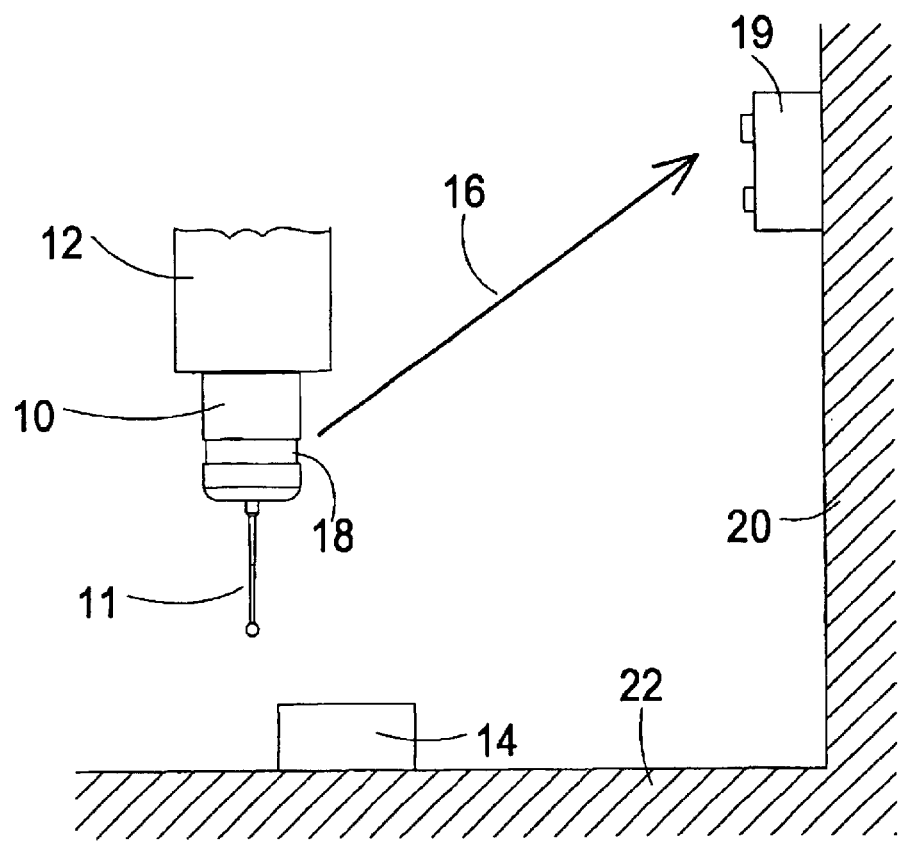
FIG. 1 is a diagrammatic view of the probe on a machine tool.

Referring to FIG. 1, the probe 10 is mounted in the spindle 12 of a machine tool exchangeably with the normal cutting tools. The spindle 12 can move the probe in three dimensions x, y, z relative to a workpiece 14 clamped on a table or bed 22 of the machine tool. Measurements are made by contact between the stylus 11 of the probe and the workpiece. Measurement signals from the probe are transmitted optically as indicated by arrow 16 to a receiver module 19 mounted on a fixed structure 20 of the machine tool. The probe 10 is battery operated. The battery powers LEDs located within window 18 which are used to transmit the optical measurement signals.

Figure 2A:
FIG. 2a is part of a codeword of optical pulses formed by the universal synchronous/asynchronous receiver transmitter (USART)

The optical measurement signals indicated by arrow 16 in FIG. 1 comprise serially transmitted codewords. Each codeword is 8 bits long and comprises a sequence of on/off pulses. These codewords are generated by signal generating means, comprising a universal synchronous/asynchronous receiver transmitter (USART). A section of codeword formed in this way is shown in FIG. 2a. Typically each pulse is 8 microseconds long and a new codeword may be transmitted every 16 milliseconds.

Using the universal synchronous/asynchronous receiver transmitter (USART) alone to generate the codewords has a disadvantage that as each pulse is relatively long this results in high power consumption and thus reduced battery life.

Figure 2B:
FIG. 2b is the output of a pulse width modulator.
Figure 2C:
FIG. 2c is the output of the universal synchronous/asynchronous receiver transmitter (USART) and pulse width modulator combined.

To overcome this disadvantage the universal synchronous/asynchronous receiver transmitter (USART) is combined with a pulse width modulator. As shown in FIG. 2B, the pulse width modulator generates a regular series of pulses of shorter pulse length and with a shorter time interval between pulses than generated by the universal synchronous/asynchronous receiver transmitter (USART). The time between pulses is typically 8 microseconds and pulse length is typically 2 microseconds. The universal synchronous/asynchronous receiver transmitter (USART) output is combined with the pulse width modulator output to provide a chopped output for transmission. As shown in FIG. 2c the form of this resultant output is the same as the form of the output of the universal synchronous/asynchronous receiver transmitter (USART) shown in FIG. 2a, however the duration of each ON pulse has been reduced to equal that of the pulse width modulator. This reduces the duration of each LED flash and therefore reduces the power consumption of the system. Battery life is therefore enhanced.

Use of the pulse width modulator in combination with the universal synchronous/asynchronous receiver transmitter (USART) has a second advantage. In previous systems without the pulse width modulator the microprocessor must control both the timing and the sequence of the pulses, however when a pulse width modulator is incorporated into the system this may be used to set the timing of the universal synchronous/asynchronous receiver transmitter (USART), i.e. it acts as a serial clock for timing. The microprocessor is used less as it is only required to send on/off messages to the universal synchronous/asynchronous receiver transmitter (USART) and therefore has improved multi-tasking.

The pulse width modulator may already be incorporated into the probe for other uses such as motor control or digital/analogue conversion. The use of existing components in the probe for the system therefore reduces component cost.

Figure 3:
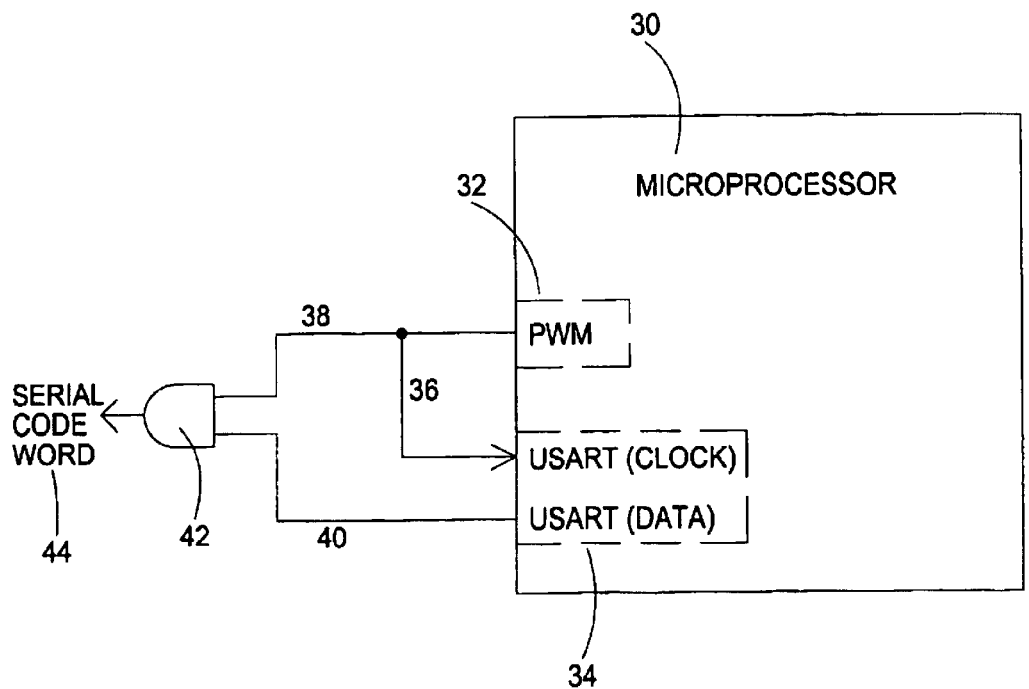
FIG. 3 is a schematic diagram showing the formation of a serial codeword.

FIG. 3 is a schematic diagram showing the formation of the serial codewords. A microprocessor 30 in the probe incorporates a pulse width modulator 32 and signal generating means in the form of a universal synchronous/asynchronous receiver transmitter (USART) 34. An output 36 from the pulse width modulator 32 controls the timing of the universal synchronous/asynchronous receiver transmitter (USART). Outputs 38,40 of the pulse width modulator 32 and the universal synchronous/asynchronous receiver transmitter (USART) 34 are combined at an AND gate 42 to form a serial codeword 44. This serial codeword is transmitted from an LED or other signal transmitting means to an external receiver.

What is claimed is:

1. A probe for position determining apparatus comprising:
   signal generating means for generating a signal;
   signal transmitting means for transmitting the signal generated by the signal generating means to a receiver module in the form of optical pulses;

characterised in that a pulse width modulator is provided to reduce the duration of each pulse.

2. A probe according to claim 1 wherein the signal generating means includes a universal synchronous/asynchronous receiver transmitter.

3. A probe according to claim 2 wherein the pulse width modulator controls the timing of the universal synchronous/asynchronous receiver transmitter.

4. A probe according to claim 1 wherein the probe is battery powered.

5. A probe according to claim 1 wherein the optical pulses are generated by light emitting diodes.

6. A probe according to claim 2 wherein the probe is battery powered.

7. A probe according to claim 3 wherein the probe is battery powered.

8. A probe according to claim 2 wherein the optical pulses are generated by light emitting diodes.

9. A probe according to claim 3 wherein the optical pulses are generated by light emitting diodes.

10. A probe according to claim 4 wherein the optical pulses are generated by light emitting diodes.

* * * * *